United States Patent
Shen et al.

(10) Patent No.: US 12,317,275 B2
(45) Date of Patent: May 27, 2025

(54) DOWNLINK CONTROL INFORMATION RECEIVING METHOD AND SENDING METHOD, USER EQUIPMENT, AND NETWORK SIDE DEVICE

(71) Applicant: VIVO MOBILE COMMUNICATION CO., LTD., Guangdong (CN)

(72) Inventors: Xiaodong Shen, Chang'an Dongguan (CN); Xueming Pan, Chang'an Dongguan (CN); Dajie Jiang, Chang'an Dongguan (CN); Kai Wu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 440 days.

(21) Appl. No.: 17/514,790

(22) Filed: Oct. 29, 2021

(65) Prior Publication Data

US 2022/0053471 A1 Feb. 17, 2022

Related U.S. Application Data

(63) Continuation of application No. PCT/CN2020/087410, filed on Apr. 28, 2020.

(30) Foreign Application Priority Data

Apr. 30, 2019 (CN) .......................... 201910365175.5

(51) Int. Cl.
*H04W 72/04* (2023.01)
*H04W 72/23* (2023.01)

(52) U.S. Cl.
CPC .................................. *H04W 72/23* (2023.01)

(58) Field of Classification Search
CPC ............. H04W 76/28; H04W 52/0229; H04W 52/0235
See application file for complete search history.

(56) References Cited

U.S. PATENT DOCUMENTS

2013/0195045 A1    8/2013   Papasakellariou et al.
2015/0085787 A1    3/2015   Ouchi
(Continued)

FOREIGN PATENT DOCUMENTS

| CN | 104081827 A | 10/2014 |
|----|-------------|---------|
| CN | 104322124 A | 1/2015  |

(Continued)

OTHER PUBLICATIONS

European Search Report in Application No. 20798797.5 Dated May 20, 2022.

(Continued)

*Primary Examiner* — Rasheed Gidado
(74) *Attorney, Agent, or Firm* — Price Heneveld LLP

(57) ABSTRACT

Embodiments of the present disclosure provide a downlink control information receiving method, a downlink control information sending method, user equipment, and a network side device. The receiving method includes: receiving configuration information of DCI, where the configuration information includes indication information of a location of a target field of user equipment and a function indicated by the target field; receiving the DCI; and obtaining the target field in the DCI based on the configuration information, and obtaining function information carried in the target field.

9 Claims, 5 Drawing Sheets

(56) References Cited

U.S. PATENT DOCUMENTS

| | | | |
|---|---|---|---|
| 2016/0212744 A1 | 7/2016 | Lyu | |
| 2017/0366377 A1* | 12/2017 | Papasakellariou | H04L 5/0053 |
| 2019/0123881 A1 | 4/2019 | Lee et al. | |
| 2020/0213070 A1* | 7/2020 | Guo | H04L 5/10 |
| 2020/0252911 A1 | 8/2020 | Zhu | |
| 2020/0314749 A1* | 10/2020 | Sarkis | H04L 5/0092 |
| 2022/0201614 A1* | 6/2022 | Wang | H04W 72/23 |

FOREIGN PATENT DOCUMENTS

| | | | |
|---|---|---|---|
| CN | 108934068 A | 12/2018 |
| CN | 109088697 A | 12/2018 |
| CN | 109417453 A | 3/2019 |
| CN | 109451795 A | 3/2019 |

OTHER PUBLICATIONS

"On PDCCH-based power saving signal/channel" 3GPP TSG RAN WG1 RAN1 Meeting #96bis, Samsung, R1-1904461, Apr. 8, 2019.

CN Office Action in Application No. 201910365175.5 dated Jan. 4, 2021.

CN Office Action in Application No. 201910365175.5 dated Jun. 18, 2021.

"Scheduling mechanisms for CBG-based re-transmission" 3GPP TSG RAN WG1 Meeting #89, R1-1706962, Huawei, HiSilicon, May 15, 2017.

"PDCCH-based power saving signal/channel design" 3GPP TSG RAN WG1 #96bis, vivo, R1-1904103, Apr. 8, 2019.

Written Opinion and International Search Report in Application No. PCT/CN2020/087410 dated Nov. 11, 2021.

\* cited by examiner

DOWNLINK CONTROL INFORMATION RECEIVING METHOD AND SENDING METHOD, USER EQUIPMENT, AND NETWORK SIDE DEVICE

CROSS-REFERENCE TO RELATED APPLICATIONS

This application is a continuation application of International Application No. PCT/CN2020/087410 filed on Apr. 28, 2020, which claims priority to Chinese Patent Application No. 201910365175.5 filed in China on Apr. 30, 2019, which are incorporated herein by reference in their entireties.

TECHNICAL FIELD

Embodiments of the present disclosure relate to the field of wireless communications technologies, and in particular, to a downlink control information receiving method, a downlink control information sending method, user equipment, and a network side device.

BACKGROUND

In a related technology, multiple fields in one piece of downlink control information (DCI) may be used to indicate multiple pieces of user equipment (UE). However, one piece of DCI can only be used to indicate one function, and flexibility is poor.

SUMMARY

According to a first aspect, an embodiment of the present disclosure provides a downlink control information receiving method, applied to user equipment and including:
  receiving configuration information of DCI, where the configuration information includes indication information of a location of a target field of the user equipment and a function indicated by the target field;
  receiving the DCI; and
  obtaining the target field in the DCI based on the configuration information, and obtaining function information carried in the target field.

According to a second aspect, an embodiment of the present disclosure provides a downlink control information sending method, applied to a network side device and including:
  sending configuration information of DCI, where the configuration information includes indication information of a location of a target field of user equipment and a function indicated by the target field; and
  sending the DCI.

According to a third aspect, an embodiment of the present disclosure provides user equipment, including:
  a first receiving module, configured to receive configuration information of downlink control information DCI, where the configuration information includes indication information of a location of a target field of the user equipment and a function indicated by the target field;
  a second receiving module, configured to receive the DCI; and
  a determining module, configured to obtain the target field in the DCI based on the configuration information, and obtain function information carried in the target field.

According to a fourth aspect, an embodiment of the present disclosure provides a network side device, including:
  a first sending module, configured to send configuration information of DCI, where the configuration information includes indication information of a location of a target field of user equipment and a function indicated by the target field; and
  a second sending module, configured to send the DCI.

According to a fifth aspect, an embodiment of the present invention provides user equipment, including a processor, a memory, and a computer program that is stored in the memory and that can run on the processor, and when the computer program is executed by the processor, steps of the foregoing downlink control information receiving method are implemented.

According to a sixth aspect, an embodiment of the present invention provides a network side device, including a processor, a memory, and a computer program that is stored in the memory and that can run on the processor, and when the computer program is executed by the processor, steps of the foregoing downlink control information sending method are implemented.

According to a seventh aspect, an embodiment of the present disclosure provides a computer-readable storage medium, where the computer-readable storage medium stores a computer program, and the computer program is executed by a processor to implement steps of the foregoing downlink control information receiving method, or the computer program is executed by a processor to implement steps of the foregoing downlink control information sending method.

BRIEF DESCRIPTION OF DRAWINGS

With reference to detailed descriptions in optional implementations in the following descriptions, various other advantages and benefits become clear to a person of ordinary skills in the art. The accompanying drawings are merely used to show the optional implementations, and are not considered as limitations to the present disclosure. In addition, in the entire accompanying drawings, same reference numerals are used to indicate the same component. In the accompanying drawings.

DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. Based on the embodiments of the present disclosure, all other embodiments obtained by a person of ordinary skill in the art shall fall within the protection scope of the present disclosure.

The term "include" and any modification thereof in the specification and claims of this application are intended to cover non-exclusive inclusion, for example, processes, methods, systems, products, or devices that contain a series of steps or units are not necessarily limited to those steps or units that are clearly listed, but may include other steps or units that are not clearly listed or are inherent to these processes, methods, products, or devices. In addition, "and/or" is used in the specification and claims to indicate at least one of connected objects, for example, A and/or B indicates three cases: only A exists, only B exists, and both A and B exist.

In the embodiments of the present disclosure, words such as "exemplary" or "for example" are used to indicate an example, an instance, or descriptions. Any embodiment or design scheme described as "exemplary" or "an example" in the embodiments of the present disclosure should not be construed as being preferable or advantageous than other embodiments or design schemes. Specifically, the words such as "exemplary" or "for example" are used to present related concepts in a specific manner.

The embodiments of the present disclosure are described below with reference to the accompanying drawings. A downlink control information receiving method, a downlink control information sending method, user equipment, and a network device that are provided in the embodiments of the present disclosure may be applied to a wireless communications system. The wireless communications system may use a 5G system, an evolved long term evolution (eLTE) system, or a subsequent eLTE system.

Figure 1:
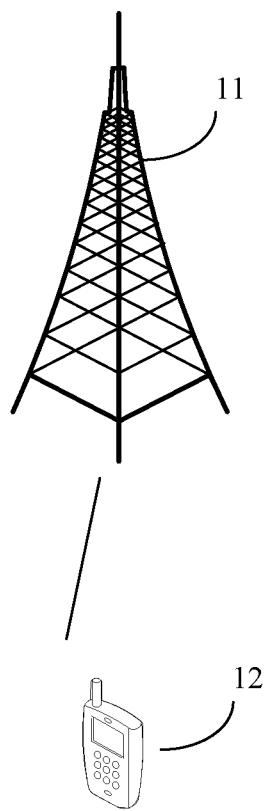
FIG. 1 is a schematic architectural diagram of a wireless communications system according to an embodiment of the present disclosure.

FIG. 1 is a schematic architectural diagram of a wireless communications system according to an embodiment of the present disclosure. As shown in FIG. 1, the wireless communications system may include a network side device 11 and user equipment 12, and the user equipment 12 may be connected to the network side device 11. In actual application, a connection between the foregoing devices may be a wireless connection. To conveniently and intuitively represent a connection relationship between the devices, a solid line is used for illustration in FIG. 1.

It should be noted that the foregoing communications system may include multiple pieces of user equipment 12, and the network side device 11 may communicate with (transmit signaling or transmit data to) the multiple pieces of user equipment 12.

The network side device 11 provided in this embodiment of the present disclosure may be a base station, and the base station may be a generally used base station, or may be an evolved node base station (eNB), or may be a device such as a network side device (for example, a next generation node base station (gNB) or a transmission and reception point (TRP)) or a cell in a 5G system, or a network side device in a subsequent evolved communications system. However, the use of words is not limited.

The user equipment 12 provided in this embodiment of the present disclosure may be a mobile phone, a tablet computer, a notebook computer, a ultra-mobile personal computer (UMPC), a netbook, a personal digital assistant (PDA), or the like. A person skilled in the art may understand that the use of words does not constitute a limitation.

Figure 2:
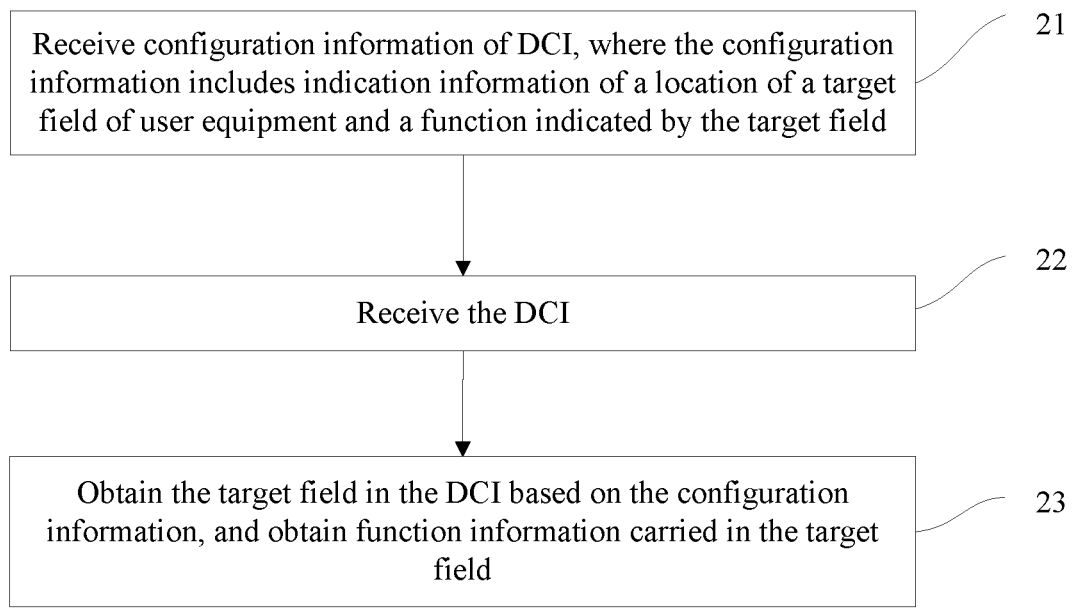
FIG. 2 is a schematic flowchart of a downlink control information receiving method according to an embodiment of the present disclosure.

Referring to FIG. 2, FIG. 2 is a schematic flowchart of a downlink control information (DCI) receiving method according to an embodiment of the present disclosure. The receiving method is applied to user equipment and includes the following steps:

Step 21: Receive configuration information of DCI, where the configuration information includes indication information of a location of a target field of the user equipment and a function indicated by the target field.

The configuration information may be sent by using higher layer signaling.

It is assumed that the DCI has X bits, and the location of the target field may be, for example, $A_1B_1$ bits (the $A_1^{th}$ bit to the $B_1^{th}$ bit).

Step 22: Receive the DCI.

The DCI is downlink control information carried by a physical downlink control channel (PDCCH) and delivered by a network side to the user equipment.

Step 23: Obtain the target field in the DCI based on the configuration information, and obtain function information carried in the target field.

For example, the function indicated by the target field is a wake-up function or a sleep function. After obtaining the target field, the user equipment determines the function information carried in the target field. It is assumed that the function information is 1, it indicates the wake-up function. In this case, the user equipment performs a wake-up behavior. It is assumed that the function information is 0, it indicates the sleep function. In this case, the user equipment performs a sleep behavior.

In this embodiment of the present disclosure, a correspondence between the function information and the function may be specified in a protocol, or may be configured by a network side device by using the configuration information.

In this embodiment of the present disclosure, after the function information carried in the target field is obtained, user equipment behavior may be determined based on the function information.

In the embodiments of the present disclosure, the network side device may dynamically configure, by using the configuration information of the DCI, the function indicated by the target field, so that the DCI may no longer fixedly indicate one function, thereby improving flexibility of the DCI.

In this embodiment of the present disclosure, optionally, the DCI includes a target field of at least one user equipment. In other words, in one piece of DCI, multiple fields may be used to indicate the same user equipment, so that multiple functions of one user equipment may be indicated in one piece of DCI.

Figure 3:
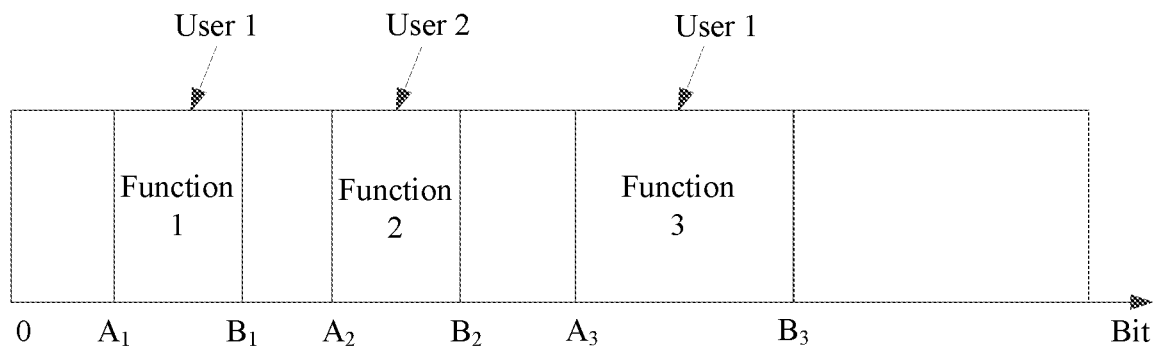
FIG. 3 is a schematic structural diagram of DCI according to an embodiment of the present disclosure.

FIG. 3 is a schematic structural diagram of DCI according to an embodiment of the present disclosure. It is assumed that there are X bits in total in the DCI, and a location of a target field corresponding to user equipment of a user 1 is bits $A_1$ to $B_1$ and bits $A_3$ to $B_3$. The bits $A_1$ to $B_1$ may indicate a function 1, and the bits $A_3$ to $B_3$ may indicate a function 3; in other words, two fields may be used in one piece of DCI to indicate two different functions of the user 1.

In this embodiment of the present disclosure, optionally, each target field indicates at least one function. In other words, each target field may indicate one or more functions, so that the DCI indicates more functions, and is more efficient.

Figure 4:
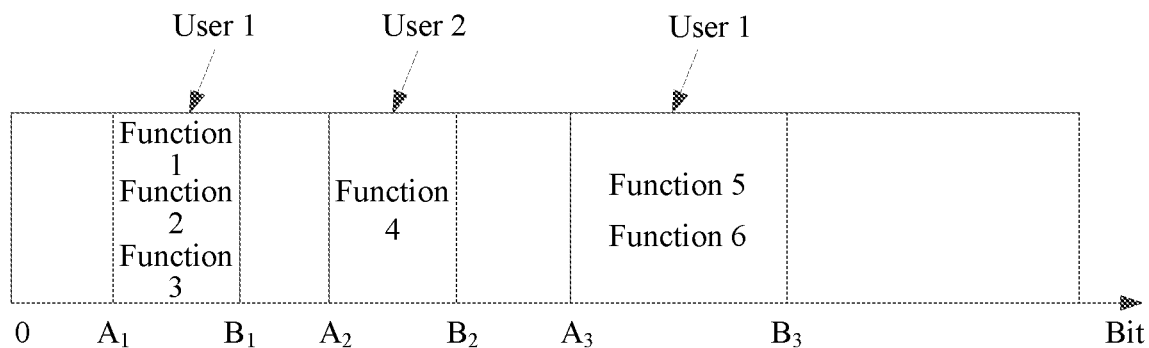
FIG. 4 is a schematic structural diagram of DCI according to another embodiment of the present disclosure.

FIG. 4 is a schematic structural diagram of DCI according to another embodiment of the present disclosure. It is assumed that there are X bits in total in the DCI, and a location of a target field corresponding to user equipment of a user 1 is bits $A_1$ to $B_1$ and bits $A_3$ to $B_3$. The bits $A_1$ to $B_1$ may indicate three functions (a function 1, a function 2, and a function 3), and the bits $A_3$ to $B_3$ may indicate two functions (a function 5 and a function 6). In other words, two fields may be used in one piece of DCI to indicate more than two functions of the user 1.

In this embodiment of the present disclosure, optionally, the function includes at least one of the following:

(1) A wake-up function or a sleep function.

When detecting that the target field in the DCI indicates the wake-up function, the user equipment wakes up at a subsequent DRX.

When detecting that the target field in the DCI indicates the sleep function, the user equipment may enter a sleep state.

(2) A function of instructing to reduce or increase a PDCCH monitoring location.

The PDCCH refers to a physical downlink control channel. The PDCCH carries scheduling information and other control information, specifically including a transmission format, resource allocation, uplink scheduling grant, power control, uplink retransmission information, and the like.

In New Radio (NR), a PDCCH configures a time-frequency domain resource (a control channel element-to-resource element group (CCE-to-REG) mapping manner, a location of a CCE frequency domain physical resource block (PRB), and a symbol length of time domain) by using a control resource set (CORESET), and configures time-frequency domain locations (a symbol location at which the PDCCH is located, a location of a slot (slot), and the like) of PDCCH candidates (PDCCH candidates) by using searchspace (searchSpace). The user equipment may obtain the locations of the PDCCH candidates by configuring the foregoing time-frequency location.

(3) A function of instructing to reduce or increase the number of PDCCH blind detection times.

(4) A function of instructing to reduce or increase the number of control channel unit (CCE) detections.

(5) A function of indicating the number of multiple-input multiple-output MIMO layers (MIMO layer) that are used for receiving or sending.

(6) A function indicating the number of receiving or sending antennas that are used.

(7) A function of triggering sending of a channel state information reference signal (CSI-RS).

(8) A function of triggering sending of a trace reference signal (TRS).

(9) A function of triggering reporting of channel state information (CSI).

(10) A function of instructing to select inter-subframe scheduling or intra-subframe scheduling.

(11) A function of instructing to select different K0 or K2 values.

A timing parameter of a hybrid automatic repeat request (HARQ) is defined as follows:

K0 is a delay between a downlink grant (Downlink grant, DL grant) and corresponding DL data (PDSCH) receiving, and is usually indicated by using a slot as a granularity.

K1 is a delay between DL receiving (PDSCH) and corresponding HARQ acknowledgement (HARQ-ACK) transmission on an uplink (Uplink, UL), and a PDSCH-to-HARQ-timing-indicator field carried in DCI is used to indicate K1 information, and is usually indicated by using a slot as a granularity.

K2 is a delay between UL grant reception and UL data (PUSCH) transmission on DL, and is usually carried in DCI and usually indicated by using a slot as a granularity.

K3 is a delay between ACK/NACK reception on UL and corresponding DL data (PDSCH) retransmission.

In the foregoing definition of the timing parameter of the HARQ, K0 is an interval between downlink grant and corresponding DL data (PDSCH) reception. When K0=0, the PDCCH and the PDSCH are received at a same slot, which is referred to as intra-subframe scheduling. When K0>0, the PDCCH and the PDSCH are not received at a same slot, which is referred to as inter-subframe scheduling.

(12) Indicating an index of a bandwidth part (BWP).

The concept of BWP is introduced in NR. The BWP refers to a set of consecutive physical resource block (PRB) resources in a given carrier value configuration (for example, a subcarrier spacing or a cyclic prefix) $\mu_i$. In NR, a maximum quantity of allowed PRBs in the set and a minimum quantity of allowed PRBs in the set are shown in the following table:

TABLE 1

Quantity of PRB resources in a given carrier value configuration $\mu_i$

| μ | $N_{RB,DL}^{min,\mu}$ | $N_{RB,DL}^{max,\mu}$ | $N_{RB,UL}^{min,\mu}$ | $N_{RB,UL}^{max,\mu}$ | Descriptions |
|---|---|---|---|---|---|
| 0 | 24 | 275 | 24 | 275 | 15 kHz |
| 1 | 24 | 275 | 24 | 275 | 30 kHz |
| 2 | 24 | 275 | 24 | 275 | 60 kHz |
| 3 | 24 | 275 | 24 | 275 | 120 kHz |
| 4 | 24 | 138 | 24 | 138 | 240 kHz |
| 5 | 24 | 69 | 24 | 69 | 480 kHz |

The user equipment may be configured with one or more BWPs, and only one BWP is activated at a same moment. The user equipment may not need to receive or is not allowed to send a physical downlink shared channel (PDSCH) or PDCCH other than the activated BWP.

(13) A function of activating the BWP or deactivating the BWP.

In this embodiment of the present disclosure, optionally, the obtaining function information carried in the target field includes: obtaining, based on a correspondence between state information and the function, the function information carried in the target field, where the state information includes at least one of the following:
- a state of the user equipment;
- a format of the DCI; or
- a first indication field in the DCI, where information carried in the first indication field is used to indicate the function indicated by the target field.

In this embodiment of the present disclosure, functions indicated by the target field may be the same or different when the state information is different. In other words, based on different state information, the function indicated by the target field may change, so that a manner of indicating the DCI is more flexible.

In this embodiment of the present disclosure, the correspondence between the state information and the function is configured on a network side or specified in a protocol.

In this embodiment of the present disclosure, the state of the user equipment includes at least one of the following:
- an active state (Active Time);
- a non-active state (non Active Time);
- a drx-onDurationTimer (discontinuous reception duration timer) running state;
- a drx-InactivityTimer (discontinuous reception inactivity timer) running state;
- a drx-RetransmissionTimerDL (discontinuous reception downlink retransmission timer) running state;
- a drx-RetransmissionTimerUL (discontinuous reception uplink retransmission timer) running state;
- a ra-ContentionResolutionTimer (random access contention resolution timer) running state; or
- a DRX OFF state.

A meaning of the foregoing active state is as follows:
When DRX is configured for the user equipment, the active state (or referred to as an active moment) includes the following cases:
When the following timer is running:
drx-onDurationTimer, or
drx-InactivityTimer, or
drx-RetransmissionTimerDL, or
drx-RetransmissionTimerUL, or
ra-ContentionResolutionTimer;
there is a to-be-sent scheduling request on the PUCCH.

In a contention-based random access preamble, for a random access preamble that is not selected by a media access control (MAC) entity, after a random access response (RAR) is successfully received, a newly transmitted PDCCH indicating a cell radio network temporary identifier (C-RNTI) to be sent to the MAC entity is not received.

For example, a target field A in the DCI indicates different functions when the user equipment is in different active states (for example, an active state and a non-active state). When the user equipment is in the non-active state, the target field A is used to instruct to wake up the user equipment (from the non-active state to the active state). When the user equipment is in the active state, the target field is not used to instruct to wake up the user equipment any longer, but is used to indicate another function, such as a sleep function, or instruct to reduce detection of a control message. The control information is, for example, a PDCCH detection location, the number of PDCCH blind detection times, or a CCE.

For another example, a target field B in the DCI indicates different functions in different DRX states. When the user equipment is in the DRX OFF state, the target field B is used for a wake-up function. When the user equipment is in the drx-onDurationTimer running state or the drx-InactivityTimer state, the target field B is used for a sleep function or instruct to reduce detection of a control message. The control information is, for example, a PDCCH detection location, the number of PDCCH blind detection times, or a CCE.

For another example, when the indication field in the DCI is used to indicate a function of a specific target field, for example, when bits 0 to 1 (an indication field) of the DCI are "00", it indicates that a target field C in the DCI is an index of the BWP, and when the bits 0 to 1 of the DCI are "01", it indicates that the target field C in the DCI is an instruction to activate/deactivate the BWP.

In this embodiment of the present disclosure, optionally, the configuration information further includes a second indication field used to indicate a carrier corresponding to the function indicated by the target field.

Figure 5:
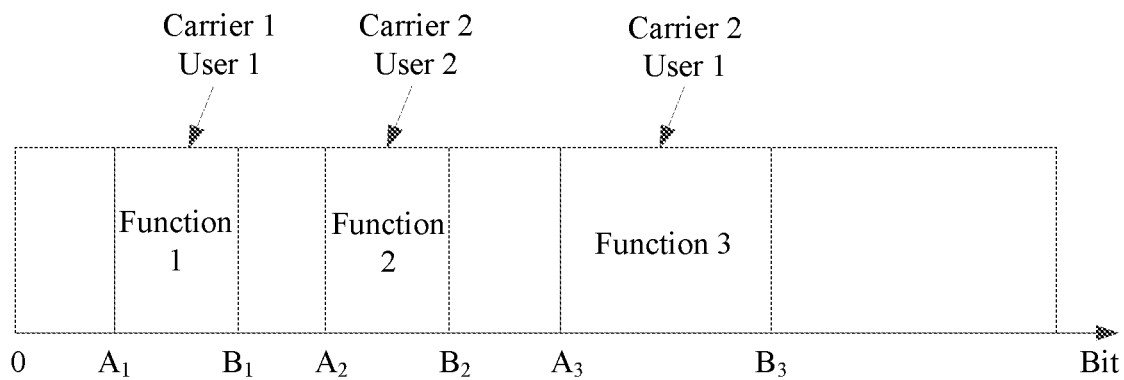
FIG. 5 is a schematic structural diagram of DCI according to still another embodiment of the present disclosure.

Referring to FIG. 5, in the embodiment shown in FIG. 5, the configuration information includes:
indication information of a location of a target field of the user equipment; for example, a target field of user equipment corresponding to a user 1 is bits $A_1$ to $B_1$ and bits $A_3$ to $B_3$; and
a function indicated by the target field; for example, bits $A_1$ to $B_1$ indicate a function 1, and bits $A_3$ to $B_3$ indicate a function 3.

The second indication field is used to indicate a carrier corresponding to the function indicated by the target field. For example, a function indicated by the bits $A_1$ to $B_1$ corresponds to DCI on a carrier 1, and the function 3 indicated by the bits $A_3$ to $B_3$ corresponds to DCI on a carrier 2.

In addition, in addition to the foregoing method for determining the carrier corresponding to the indication field based on the configuration information, information about the carrier corresponding to the user equipment may alternatively be carried in the DCI. The user equipment learns a carrier corresponding to an indication field by reading the information in the DCI.

Figure 6:
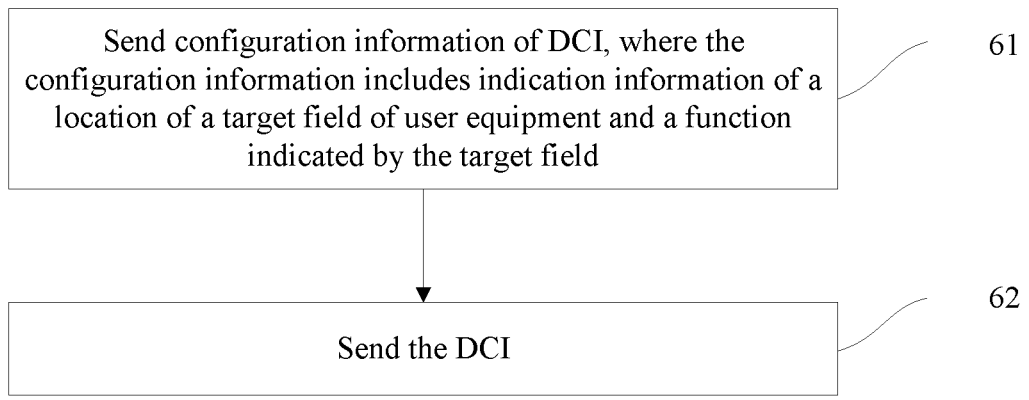
FIG. 6 is a schematic flowchart of a downlink control information sending method according to an embodiment of the present disclosure.

Referring to FIG. 6, an embodiment of the present disclosure provides a downlink control information sending method, applied to a network side device. The method includes the following steps:

Step 61: Send configuration information of DCI, where the configuration information includes indication information of a location of a target field of user equipment and a function indicated by the target field.

Step 62: Send the DCI.

In this embodiment of the present disclosure, the network side device may dynamically configure, by using the configuration information of the DCI, the function indicated by the target field of the user equipment, so that the DCI no longer fixedly indicates one function, thereby improving flexibility of the DCI.

In this embodiment of the present disclosure, optionally, the DCI includes a target field of at least one user equipment. In other words, in one piece of DCI, multiple fields may be used to indicate the same user equipment, so that multiple functions of one user equipment may be indicated in one piece of DCI.

In this embodiment of the present disclosure, optionally, each target field indicates at least one function. In other words, each target field may indicate one or more functions, so that the DCI indicates more functions, and is more efficient.

In this embodiment of the present disclosure, optionally, the DCI includes at least two fields indicating different user equipment, in other words, indications of multiple pieces of user equipment may be combined into one DCI for transmission, so that the DCI is more efficient.

Referring to FIG. 3, DCI in FIG. 3 may indicate two pieces of user equipment at the same time: a user 1 and a user 2. Locations of fields corresponding to user equipment of the user 1 are bits $A_1$ to $B_1$ and bits $A_3$ to $B_3$. Locations of fields corresponding to user equipment of the user 2 are bits $A_2$ to $B_2$.

In this embodiment of the present disclosure, optionally, functions indicated by at least two fields supported in the DCI are different; in other words, one piece of DCI may indicate multiple functions. Referring to FIG. 3, the DCI in FIG. 3 may indicate three functions (a function 1, a function 2, and a function 3) at the same time.

In this embodiment of the present disclosure, one piece of DCI may indicate multiple different functions of multiple pieces of user equipment, and indication efficiency of the DCI is relatively high.

In this embodiment of the present disclosure, optionally, there are N fields in the DCI, M fields can be used as the target field to indicate a function of the user equipment, and M is less than or equal to N. In other words, the foregoing function may be dynamically configured for all the M fields.

In this embodiment of the present disclosure, optionally, the function includes at least one of the following:
  a wake-up function or a sleep function;
  a function of reducing or increasing a PDCCH monitoring location;
  a function of reducing or increasing the number of PDCCH blind detection times;
  a function of reducing or increasing the number of CCE detections;
  a function indicating the number of MIMO layers for receiving or sending;
  a function indicating the number of receiving or sending antennas;
  a function of triggering sending of a CSI-RS;
  a function of triggering sending of a TRS;
  a function of triggering reporting of CSI;
  a function of selecting inter-subframe scheduling or intra-subframe scheduling;
  a function of selecting different K0 or K2 values;
  a function of indicating an index of a BWP; or
  a function of activating the BWP or deactivating the BWP.

In this embodiment of the present disclosure, optionally, the configuration information further includes a correspondence between state information and the function, and the state information includes at least one of the following:
  a state of the user equipment; or
  a format of the DCI.

Information carried in the first indication field is used to indicate the function indicated by the target field.

Different state information indicates the same function indicated by the target field or different functions indicated by the target field.

In this embodiment of the present disclosure, optionally, the state of the user equipment includes at least one of the following:
  an active state;
  a non-active state;
  a drx-onDurationTimer running state;
  a drx-InactivityTimer running state;
  a drx-RetransmissionTimerDL running state;
  a drx-RetransmissionTimerUL running state;
  a ra-ContentionResolutionTimer running state; or
  a DRX OFF state.

A meaning of the foregoing active state is as follows:
When DRX is configured for the user equipment, the active state (or referred to as an active moment) includes the following cases:
  When the following timer is running:
  drx-onDurationTimer, or
  drx-InactivityTimer, or
  drx-RetransmissionTimerDL, or
  drx-RetransmissionTimerUL, or
  ra-ContentionResolutionTimer;
  there is a to-be-sent scheduling request on the PUCCH.

In a contention-based random access preamble, for a random access preamble that is not selected by a MAC entity, after a random access response (RAR) is successfully received, a newly transmitted PDCCH indicating a C-RNTI to be sent to the MAC entity is not received.

In this embodiment of the present disclosure, the configuration information further includes a second indication field used to indicate a carrier corresponding to the function indicated by the target field.

Figure 7:
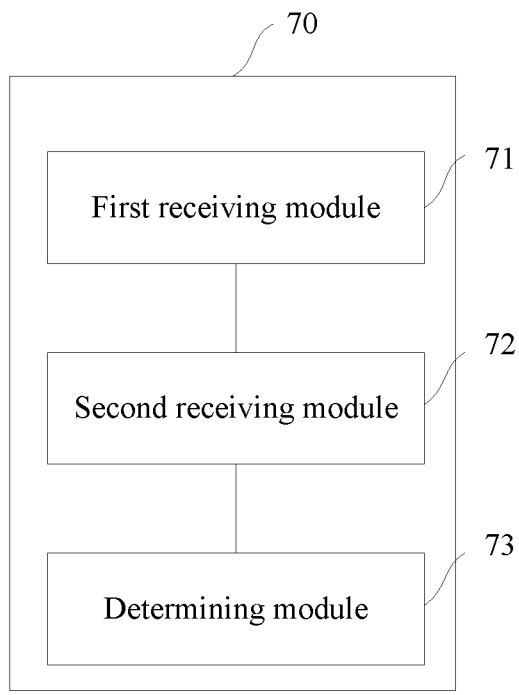
FIG. 7 is a schematic structural diagram of user equipment according to an embodiment of the present disclosure.

Referring to FIG. 7, an embodiment of the present disclosure provides user equipment 70, including:
  a first receiving module 71, configured to send configuration information of DCI, where the configuration information includes indication information of a location of a target field of user equipment and a function indicated by the target field; and
  a second receiving module 72, configured to receive the DCI; and
  a determining module 73, configured to obtain the target field in the DCI based on the configuration information, and obtain function information carried in the target field.

Optionally, the DCI includes a target field of at least one user equipment.

Optionally, each target field indicates at least one function.

Optionally, the function includes at least one of the following:
  a wake-up function or a sleep function;
  a function of reducing or increasing a PDCCH monitoring location;
  a function of reducing or increasing the number of PDCCH blind detection times;
  a function of reducing or increasing the number of CCE detections;
  a function indicating the number of MIMO layers for receiving or sending;
  a function indicating the number of receiving or sending antennas;
  a function of triggering sending of a channel CSI-RS;
  a function of triggering sending of a TRS;
  a function of triggering reporting of CSI;
  a function of selecting inter-subframe scheduling or intra-subframe scheduling;
  a function of selecting different K0 or K2 values;
  a function of indicating an index of a bandwidth part BWP; or
  a function of activating the BWP or deactivating the BWP.

Optionally, the obtaining function information carried in the target field includes:
  obtaining, based on a correspondence between state information and the function, the function information carried in the target field, where the state information includes at least one of the following:

a state of the user equipment;
a format of the DCI; or
a first indication field in the DCI, where information carried in the first indication field is used to indicate the function indicated by the target field.

Optionally, the correspondence between the state information and the function is configured on a network side or specified in a protocol.

Optionally, the state of the user equipment includes at least one of the following:
an active state;
a non-active state;
a drx-onDurationTimer running state;
a drx-InactivityTimer running state;
a drx-RetransmissionTimerDL running state;
a drx-RetransmissionTimerUL running state;
a ra-ContentionResolutionTimer running state; or
a DRX OFF state.

Optionally, the configuration information further includes a second indication field used to indicate a carrier corresponding to the function indicated by the target field.

Figure 8:
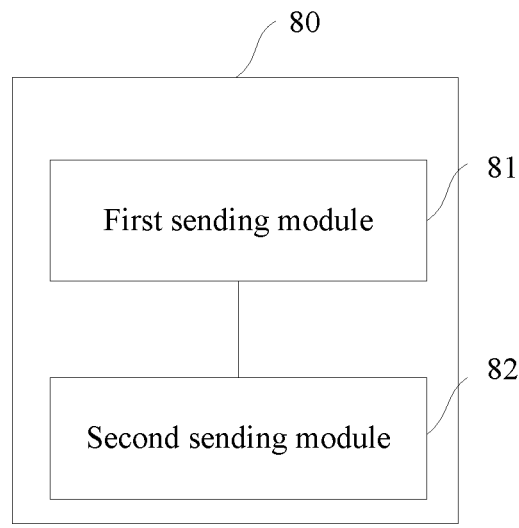
FIG. 8 is a schematic structural diagram of a network side device according to an embodiment of the present disclosure.

Referring to FIG. 8, an embodiment of the present disclosure provides a network side device 80, including:
a first sending module 81, configured to send configuration information of DCI, where the configuration information includes indication information of a location of a target field of user equipment and a function indicated by the target field; and
a second sending module 82, configured to send the DCI.

Optionally, the DCI includes a target field of at least one user equipment.

Optionally, each target field indicates at least one function.

Optionally, the DCI includes at least two fields indicating different user equipment.

Optionally, the DCI includes at least two fields indicating different functions.

Optionally, the function includes at least one of the following:
a wake-up function or a sleep function;
a function of reducing or increasing a PDCCH monitoring location;
a function of reducing or increasing the number of PDCCH blind detection times;
a function of reducing or increasing the number of CCE detections;
a function indicating the number of MIMO layers for receiving or sending;
a function indicating the number of receiving or sending antennas;
a function of triggering sending of a CSI-RS;
a function of triggering sending of a TRS;
a function of triggering reporting of CSI;
a function of selecting inter-subframe scheduling or intra-subframe scheduling;
a function of selecting different K0 or K2 values;
a function of indicating an index of a BWP; or
a function of activating the BWP or deactivating the BWP.

Optionally, the configuration information further includes a correspondence between state information and the function, and the state information includes at least one of the following:
a state of the user equipment;
a format of the DCI; or
a first indication field in the DCI, where information carried in the first indication field is used to indicate the function indicated by the target field.

Optionally, the state of the user equipment includes at least one of the following:
an active state;
a non-active state;
a drx-onDurationTimer running state;
a drx-InactivityTimer running state;
a drx-RetransmissionTimerDL running state;
a drx-RetransmissionTimerUL running state;
a ra-ContentionResolutionTimer running state; or
a DRX OFF state.

Optionally, the configuration information further includes a second indication field used to indicate a carrier corresponding to the function indicated by the target field.

Figure 9:
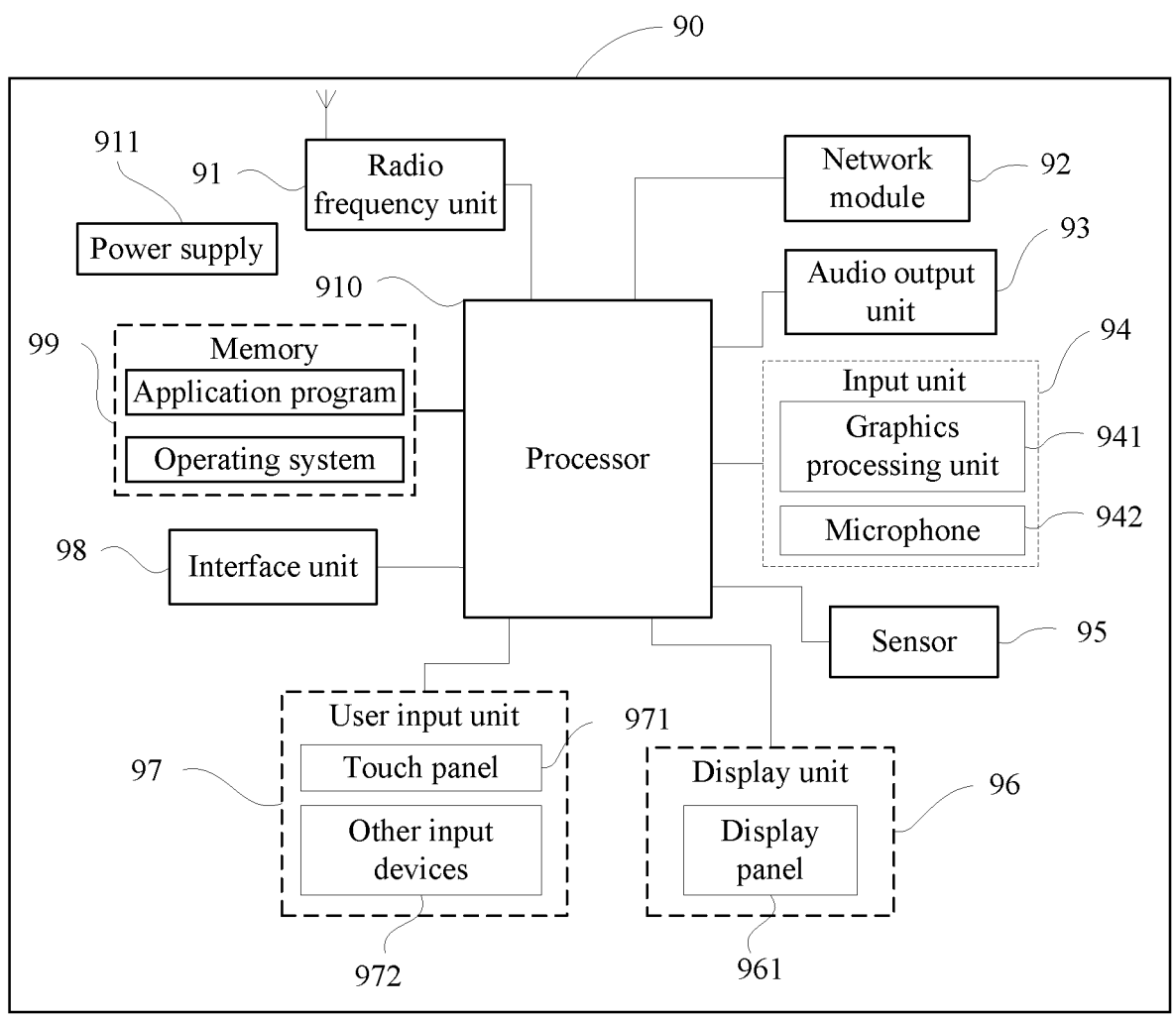
FIG. 9 is a schematic structural diagram of user equipment according to another embodiment of the present disclosure.

FIG. 9 is a schematic structural diagram of user equipment according to another embodiment of the present disclosure. The user equipment 90 includes but is not limited to components such as a radio frequency unit 91, a network module 92, an audio output unit 93, an input unit 94, a sensor 95, a display unit 96, a user input unit 97, an interface unit 98, a memory 99, a processor 910, and a power supply 911. A person skilled in the art may understand that a structure of the user equipment shown in FIG. 9 does not constitute a limitation on the user equipment, and the user equipment may include more or fewer components than those shown in the figure, or combine some components, or have different component arrangements. In this embodiment of the present disclosure, the user equipment includes but is not limited to a mobile phone, a tablet computer, a laptop computer, a palmtop computer, an in-vehicle user equipment, a wearable device, a pedometer, and the like.

The radio frequency unit 91 is configured to: send configuration information of DCI, where the configuration information includes indication information of a location of a target field of user equipment and a function indicated by the target field; and receive the DCI.

The processor 910 is configured to: obtain the target field in the DCI based on the configuration information, and obtain function information carried in the target field.

In the embodiments of the present disclosure, the network side device may dynamically configure, by using the configuration information of the DCI, the function indicated by the target field, so that the DCI may no longer fixedly indicate one function, thereby improving flexibility of the DCI.

It should be understood that, in this embodiment of the present disclosure, the radio frequency unit 91 may be configured to receive and send information or receive and send a signal in a call process. Specifically, after downlink data from a base station is received, the processor 910 processes the downlink data. In addition, uplink data is sent to the base station. Generally, the radio frequency unit 91 includes but is not limited to an antenna, at least one amplifier, a transceiver, a coupler, a low noise amplifier, a duplexer, and the like. In addition, the radio frequency unit 91 may further communicate with a network and another device by using a wireless communication system.

The user equipment provides wireless broadband Internet access for the user by using the network module 92, for example, helping the user send and receive an email, browsing a web page, and accessing streaming media.

The audio output unit 93 may convert audio data received by the radio frequency unit 91 or the network module 92 or stored in the memory 99 into an audio signal and output as sound. In addition, the audio output unit 93 may further provide audio output (for example, call signal receiving sound or message receiving sound) related to a specific function performed by the user equipment 90. The audio output unit 93 includes a loudspeaker, a buzzer, a telephone receiver, and the like.

The input unit 94 is configured to receive an audio or video signal. The input unit 94 may include a graphics processing unit (GPU) 941 and a microphone 942. The graphics processing unit 941 processes image data of a static picture or a video obtained by an image capture apparatus (such as a camera) in a video capture mode or an image capture mode. A processed image frame may be displayed on the display unit 96. The image frame processed by the graphics processing unit 941 may be stored in the memory 99 (or another storage medium) or sent by using the radio frequency unit 91 or the network module 92. The microphone 942 may receive sound and can process such sound into audio data. The processed audio data may be output by being converted into a format that may be sent to a mobile communications base station by using the radio frequency unit 91 in a telephone call mode.

The user equipment 90 further includes at least one sensor 95, such as an optical sensor, a motion sensor, and another sensor. Specifically, the optical sensor includes an ambient light sensor and a proximity sensor. The ambient light sensor may adjust luminance of the display panel 961 based on brightness of ambient light, and the proximity sensor may disable the display panel 961 and/or backlight when the user equipment 90 approaches an ear. As a type of the motion sensor, an accelerometer sensor may detect magnitude of an acceleration in each direction (generally three axes), and may detect magnitude and a direction of gravity when being static. The accelerometer sensor may be used for recognizing a terminal device gesture (for example, horizontal and vertical screen switching, a related game, or magnetometer posture calibration), a function related to vibration recognition (for example, a pedometer or a strike), or the like. The sensor 95 may further include a fingerprint sensor, a pressure sensor, an iris sensor, a molecular sensor, a gyroscope, a barometer, a hygrometer, a thermometer, an infrared sensor, and the like. This is not described herein again.

The display unit 96 is configured to display information entered by the user or information provided for the user. The display unit 96 may include the display panel 961, and the display panel 961 may be configured in a form of a liquid crystal display (LCD), an organic light-emitting diode (OLED), or the like.

The user input unit 97 may be configured to receive input digit or character information and generate key signal input related to user setting and function control of the user equipment. Specifically, the user input unit 97 includes a touch panel 971 and another input device 972. The touch panel 971, also referred to as a touchscreen, may collect a touch operation performed by the user on or near the touch panel 971 (for example, an operation performed by the user on or near the touch panel 971 by using any suitable object or accessory such as a finger or a stylus). The touch panel 971 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 910, and can receive and execute a command sent by the processor 910. In addition, the touch panel 971 may be implemented by using multiple types such as a resistive type, a capacitive type, an infrared ray, and a surface acoustic wave. The user input unit 97 may include another input device 972 in addition to the touch panel 971. Specifically, the another input device 972 may include but is not limited to one or more of a physical keyboard, a function key (such as a volume control key or an on/off key), a trackball, a mouse, a joystick, and the like. Details are not described herein.

Further, the touch panel 971 may cover the display panel 961. After detecting the touch operation on or near the touch panel 971, the touch panel 971 transmits the touch operation to the processor 910 to determine a type of a touch event, and then the processor 910 provides corresponding visual output on the display panel 961 based on the type of the touch event. In FIG. 9, the touch panel 971 and the display panel 961 are used as two independent components to implement input and output functions of the user equipment. However, in some embodiments, the touch panel 971 and the display panel 961 may be integrated to implement the input and output functions of the user equipment. This is not specifically limited herein.

The interface unit 98 is an interface connecting an external apparatus to the user equipment 90. For example, the external apparatus may include a wired or wireless headset port, an external power supply (or battery charger) port, a wired or wireless data port, a storage card port, a port configured to connect to an apparatus having an identification module, an audio input/output (I/O) port, a video I/O port, a headset port, and the like. The interface unit 98 may be configured to receive input (for example, data information and power) from the external apparatus and transmit the received input to one or more elements in the user equipment 90, or may be configured to transmit data between the user equipment 90 and the external apparatus.

The memory 99 may be configured to store a software program and various data.

The memory 99 may mainly include a program storage area and a data storage area. The program storage area may store an operating system, an application program required by at least one function (such as a sound play function or an image play function), and the like. The data storage area may store data (such as audio data or an address book) or the like created based on use of the mobile phone. In addition, the memory 99 may include a high-speed random access memory, or may include a non-volatile memory such as at least one disk storage component, a flash memory component, or another non-volatile solid-state storage component.

The processor 910 is a control center of the user equipment, and is connected to all parts of the entire user equipment by using various interfaces and lines, and performs various functions of the user equipment and processes data by running or executing the software program and/or the module that are stored in the memory 99 and invoking the data stored in the memory 99, to implement overall monitoring on the user equipment. The processor 910 may include one or more processing units. Optionally, the processor 910 may be integrated with an application processor and a modem processor. The application processor mainly processes an operating system, a user interface, an application program, and the like, and the modem processor mainly processes wireless communication. It may be understood that the modem processor may also not be integrated into the processor 910.

The user equipment 90 may further include the power supply 911 (such as a battery) that supplies power to each component. Optionally, the power supply 911 may be logically connected to the processor 910 by using a power management system, to implement functions such as charging, discharging, and power consumption management by using the power management system.

In addition, the user equipment 90 includes some function modules not shown, and details are not described herein.

Figure 10:
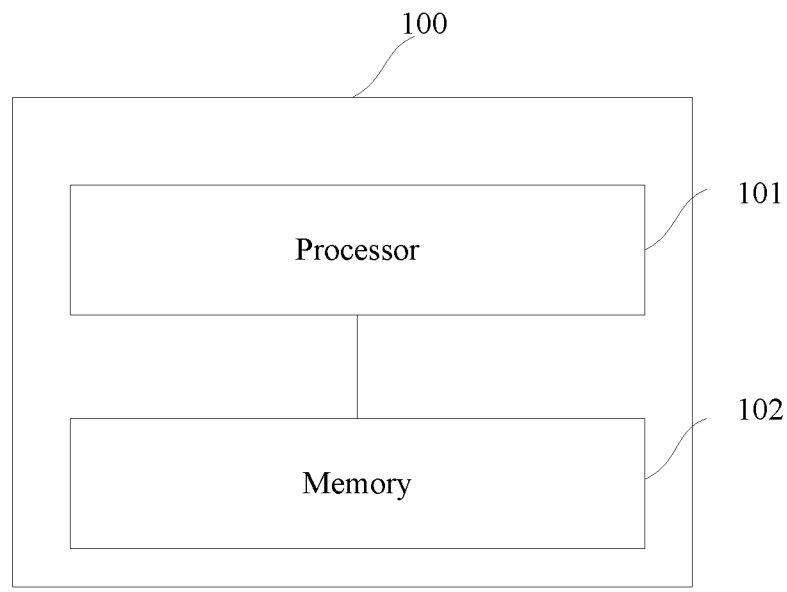
FIG. 10 is a schematic structural diagram of user equipment according to still another embodiment of the present disclosure.

Referring to FIG. 10, FIG. 10 is a schematic structural diagram of user equipment according to still another embodiment of the present disclosure. The user equipment 100 includes a processor 101 and a memory 102. In this embodiment of the present disclosure, the user equipment 100 further includes a computer program that is stored in the memory 102 and that can run on the processor 101. When the computer program is executed by the processor 101, the following steps are implemented:

receiving configuration information of DCI, where the configuration information includes indication information of a location of a target field of user equipment and a function indicated by the target field;

receiving the DCI; and obtaining the target field in the DCI based on the configuration information, and obtaining function information carried in the target field.

The processor 101 is responsible for managing the bus architecture and common processing, and the memory 102 may store data used when the processor 101 performs an operation.

Optionally, the DCI includes a target field of at least one user equipment.

Optionally, each target field indicates at least one function.

Optionally, the function includes at least one of the following:

a wake-up function or a sleep function;
a function of reducing or increasing a PDCCH monitoring location;
a function of reducing or increasing the number of PDCCH blind detection times;
a function of reducing or increasing the number of CCE detections;
a function indicating the number of MIMO layers for receiving or sending;
a function indicating the number of receiving or sending antennas;
a function of triggering sending of a channel CSI-RS;
a function of triggering sending of a TRS;
a function of triggering reporting of CSI;
a function of selecting inter-subframe scheduling or intra-subframe scheduling;
a function of selecting different K0 or K2 values;
a function of indicating an index of a BWP; or
a function of activating the BWP or deactivating the BWP.

Optionally, when the computer program is executed by the processor 101, the following steps may be further implemented:

the obtaining function information carried in the target field includes:

obtaining, based on a correspondence between state information and the function, the function information carried in the target field, where the state information includes at least one of the following:

a state of the user equipment;
a format of the DCI; and
a first indication field in the DCI, where information carried in the first indication field is used to indicate the function indicated by the target field.

Optionally, the correspondence between the state information and the function is configured on a network side or specified in a protocol.

Optionally, the state of the user equipment includes at least one of the following:

an active state;
a non-active state;
a drx-onDurationTimer running state;
a drx-InactivityTimer running state;
a drx-RetransmissionTimerDL running state;
a drx-RetransmissionTimerUL running state;
a ra-ContentionResolutionTimer running state; or
a DRX OFF state.

Optionally, the configuration information further includes a second indication field used to indicate a carrier corresponding to the function indicated by the target field.

Figure 11:
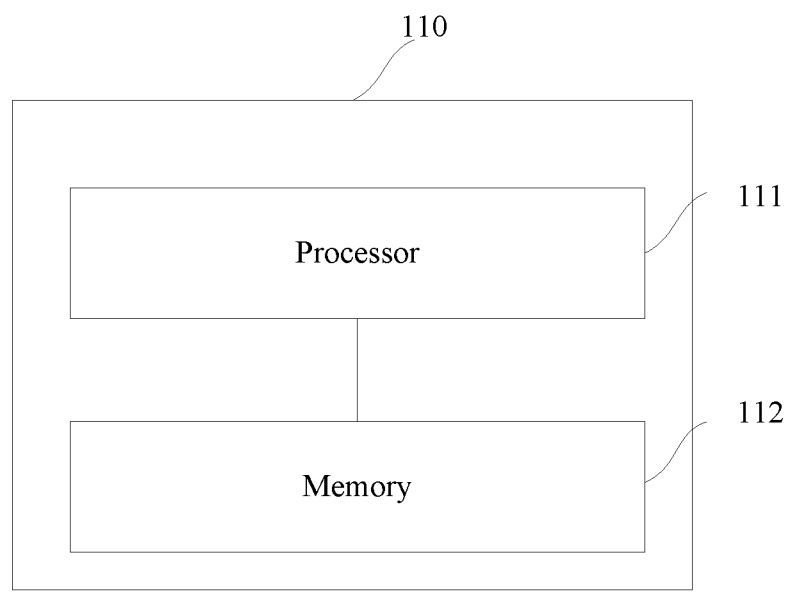
FIG. 11 is a schematic structural diagram of a network side device according to another embodiment of the present disclosure.

Referring to FIG. 11, FIG. 11 is a schematic structural diagram of a network side device according to still another embodiment of the present disclosure. The network side device 110 includes a processor 111 and a memory 112. In this embodiment of the present disclosure, the network side device 110 further includes a computer program that is stored in the memory 112 and that can run on the processor 111. When the computer program is executed by the processor 111, the following steps are implemented:

sending configuration information of DCI, where the configuration information includes indication information of a location of a target field of user equipment and a function indicated by the target field; and sending the DCI.

Optionally, the DCI includes a target field of at least one user equipment.

Optionally, each target field indicates at least one function.

Optionally, the DCI includes at least two fields indicating different user equipment.

Optionally, the DCI includes at least two fields indicating different functions.

Optionally, the function includes at least one of the following:

a wake-up function or a sleep function;
a function of reducing or increasing a PDCCH monitoring location;
a function of reducing or increasing the number of PDCCH blind detection times;
a function of reducing or increasing the number of CCE detections;
a function indicating the number of MIMO layers for receiving or sending;
a function indicating the number of receiving or sending antennas;
a function of triggering sending of a CSI-RS;
a function of triggering sending of a TRS;
a function of triggering reporting of CSI;
a function of selecting inter-subframe scheduling or intra-subframe scheduling;
a function of selecting different K0 or K2 values;
a function of indicating an index of a BWP; or
a function of activating the BWP or deactivating the BWP.

Optionally, the configuration information further includes a correspondence between state information and the function, and the state information includes at least one of the following:

a state of the user equipment;
a format of the DCI; or
a first indication field in the DCI, where information carried in the first indication field is used to indicate the function indicated by the target field.

Optionally, the state of the user equipment includes at least one of the following:
an active state;
a non-active state;
a drx-onDurationTimer running state;
a drx-InactivityTimer running state;
a drx-RetransmissionTimerDL running state;
a drx-RetransmissionTimerUL running state;
a ra-ContentionResolutionTimer running state; or
a DRX OFF state.

Optionally, the configuration information further includes a second indication field used to indicate a carrier corresponding to the function indicated by the target field.

An embodiment of the present disclosure further provides a computer-readable storage medium. A computer program is stored in the computer-readable storage medium. When the computer program is executed by a processor, each process of the foregoing embodiments of the foregoing downlink control information receiving method or the foregoing downlink control information sending method is implemented, and a same technical effect can be achieved. To avoid repetition, details are not described herein. The computer-readable storage medium includes a read-only memory (ROM), a random access memory (RAM), a magnetic disk, an optical disc, or the like.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element.

According to the descriptions of the foregoing implementations, a person skilled in the art may clearly understand that the foregoing method embodiments may be implemented by using software and a required universal hardware platform, or certainly may be implemented by using hardware. However, in many cases, the former is a better implementation. Based on such an understanding, the technical solutions of the present disclosure essentially or the part contributing to related technologies may be implemented in a form of a software product. The computer software product is stored in a storage medium (such as a ROM/RAM, a magnetic disk, or an optical disc) and includes several instructions for instructing user equipment (which may be a mobile phone, a computer, a server, an air conditioner, or a network device) to execute the methods described in the embodiments of the present disclosure.

The embodiments of the present disclosure are described with reference to the accompanying drawings above. However, the present disclosure is not limited to the foregoing specific implementations. The foregoing specific implementations are merely exemplary, but are not limiting. A person of ordinary skill in the art may make many forms without departing from the objective and the scope of the claims of the present disclosure.

The invention claimed is:

1. A downlink control information receiving method, applied to user equipment and comprising:
receiving configuration information of downlink control information (DCI) from a network side device through a higher-layer signaling, wherein the configuration information comprises indication information of a location, in the DCI, of a target field of the user equipment and comprises at least two functions indicated by the target field, the target field comprises at least two fields, and each of the at least two fields indicates at least one of the at least two functions;
receiving the DCI, wherein the DCI comprises two or more target fields corresponding to the different user equipments, and the user equipment being one of the different user equipments; and
obtaining the target field corresponding to the UE in the DCI based on the configuration information, and
obtaining function information carried in the target field,
wherein the at least two functions at least comprise a wake-up/sleep function and a function of activating a Bandwidth Part (BWP) or deactivating the BWP,
wherein the obtaining function information carried in the target field comprises:
obtaining, based on a correspondence between state information and a function of the at least two functions, the function information carried in the target field, wherein the state information comprises at least one of the following:
a state of the user equipment;
a format of the DCI; or
a first indication field in the DCI, wherein information carried in the first indication field is used to indicate the at least two functions indicated by the target field,
wherein the state of the user equipment comprises at least one of the following:
a discontinuous reception duration timer drx-onDurationTimer running state;
a discontinuous reception inactivity timer drx-InactivityTimer running state;
a discontinuous reception downlink retransmission timer drx-RetransmissionTimerDL running state;
a discontinuous reception uplink retransmission timer drx-RetransmissionTimerUL running state; or,
a random access contention resolution timer ra-ContentionResolutionTimer running state;
wherein the configuration information further comprises a second indication field used to indicate a carrier corresponding to a function of the at least two functions indicated by the target field.

2. The method according to claim 1, wherein functions indicated by other field in the target field comprise at least one of the following:
a function of reducing or increasing a physical downlink control channel (PDCCH) monitoring location;
a function of reducing or increasing the number of PDCCH blind detection times;
a function of reducing or increasing the number of control channel unit (CCE) detections;
a function of indicating the number of multiple-input multiple-output (MIMO) layers for receiving or sending;
a function indicating the number of receiving or sending antennas;
a function of triggering sending of a channel state information reference signal (CSI-RS);
a function of triggering sending of a trace reference signal (TRS);
a function of triggering reporting of channel state information (CSI);
a function of selecting inter-subframe scheduling or intra-subframe scheduling;
a function of selecting different K0 or K2 values; or
a function of indicating an index of a BWP.

3. The method according to claim 1, wherein the state of the user equipment further comprises at least one of the following:
- an active state;
- a non-active state; or
- a discontinuous reception off DRX OFF state.

4. A downlink control information sending method, applied to a network side device and comprising:
- sending configuration information of Downlink Control Information (DCI) to a user equipment through a higher-layer signaling, wherein the configuration information comprises indication information of a location, in the DCI, of a target field of the user equipment and comprises at least two functions indicated by the target field, the target field comprises at least two fields, and each of the at least two fields indicates at least one of the at least two functions; and
- sending the DCI, wherein the DCI comprises two or more target fields corresponding to different user equipments, and the user equipment being one of the different user equipments,
- wherein the at least two functions at least comprise a wake-up/sleep function and a function of activating a Bandwidth Part (BWP) or deactivating the BWP,
- wherein the configuration information further comprises a correspondence between state information and a function of the at least two functions, and the state information comprises at least one of the following:
- a state of the user equipment;
- a format of the DCI; or
- a first indication field in the DCI, wherein information carried in the first indication field is used to indicate the at least two functions indicated by the target field,
- wherein the state of the user equipment comprises at least one of the following:
- a discontinuous reception duration timer drx-onDurationTimer running state;
- a discontinuous reception inactivity timer drx-InactivityTimer running state;
- a discontinuous reception downlink retransmission timer drx-Retransmission TimerDL running state;
- a discontinuous reception uplink retransmission timer drx-RetransmissionTimerUL running state; or,
- a random access contention resolution timer ra-ContentionResolutionTimer running state;
- wherein the configuration information further comprises a second indication field used to indicate a carrier corresponding to a function of the at least two functions indicated by the target field.

5. The method according to claim 4, wherein functions indicated by other field in the target field comprise at least one of the following:
- a function of reducing or increasing a PDCCH monitoring location;
- a function of reducing or increasing the number of PDCCH blind detection times;
- a function of reducing or increasing the number of CCE detections;
- a function indicating the number of MIMO layers for receiving or sending;
- a function indicating the number of receiving or sending antennas;
- a function of triggering sending of a CSI-RS;
- a function of triggering sending of a TRS;
- a function of triggering reporting of CSI;
- a function of selecting inter-subframe scheduling or intra-subframe scheduling;
- a function of selecting different K0 or K2 values; or
- a function of indicating an index of a BWP.

6. The method according to claim 4, wherein the state of the user equipment further comprises at least one of the following:
- an active state;
- a non-active state;
- a DRX OFF state.

7. User equipment, comprising: a processor, a memory, and a computer program that is stored in the memory and that can run on the processor, wherein the computer program is executed by the processor to implement:
- receiving configuration information of downlink control information (DCI) from a network side device through a higher layer signaling, wherein the configuration information comprises indication information of a location, in the DCI, of a target field of the user equipment and comprises at least two functions indicated by the target field, the target field comprises at least two fields, and each of the at least two fields indicates at least one of the at least two functions;
- receiving the DCI, wherein the DCI comprises two or more target fields corresponding to the different user equipments, and the user equipment being one of the different user equipments; and
- obtaining a target field in the DCI based on the configuration information, and obtaining function information carried in the target field, wherein the at least two functions at least comprise a wake-up/sleep function and a function of activating a Bandwidth Part (BWP) or deactivating the BWP,
- wherein the obtaining function information carried in the target field comprises:
- obtaining, based on a correspondence between state information and a function of the at least two functions, the function information carried in the target field, wherein the state information comprises at least one of the following:
- a state of the user equipment;
- a format of the DCI; or
- a first indication field in the DCI, wherein information carried in the first indication field is used to indicate the at least two functions indicated by the target field,
- wherein the state of the user equipment comprises at least one of the following:
- a discontinuous reception duration timer drx-onDurationTimer running state;
- a discontinuous reception inactivity timer drx-InactivityTimer running state;
- a discontinuous reception downlink retransmission timer drx-RetransmissionTimerDL running state;
- a discontinuous reception uplink retransmission timer drx-RetransmissionTimerUL running state; or,
- a random access contention resolution timer ra-ContentionResolutionTimer running state;
- wherein the configuration information further comprises a second indication field used to indicate a carrier corresponding to a function of the at least two functions indicated by the target field.

8. The user equipment according to claim 7, wherein functions indicated by other field in the target field comprise at least one of the following:
- a function of reducing or increasing a physical downlink control channel (PDCCH) monitoring location;

a function of reducing or increasing the number of PDCCH blind detection times;

a function of reducing or increasing the number of control channel unit (CCE) detections;

a function of indicating the number of multiple-input multiple-output (MIMO) layers for receiving or sending;

a function indicating the number of receiving or sending antennas;

a function of triggering sending of a channel state information reference signal (CSI-RS);

a function of triggering sending of a trace reference signal (TRS);

a function of triggering reporting of channel state information (CSI);

a function of selecting inter-subframe scheduling or intra-subframe scheduling;

a function of selecting different K0 or K2 values; or a function of indicating an index of a BWP.

9. The user equipment according to claim 7, wherein the state of the user equipment further comprises at least one of the following:

an active state;

a non-active state;

or a discontinuous reception off DRX OFF state.

* * * * *